United States Patent [19]

Asano et al.

[11] Patent Number: 4,498,942
[45] Date of Patent: Feb. 12, 1985

[54] ELECTROLYSIS APPARATUS USING A DIAPHRAGM OF A SOLID POLYMER ELECTROLYTE, AND METHOD FOR PRODUCTION THEREOF

[75] Inventors: Hiroshi Asano; Takayuki Shimamune; Toshiki Goto, all of Chiba, Japan

[73] Assignee: Permelec Electrode Ltd., Tokyo, Japan

[21] Appl. No.: 503,452

[22] Filed: Jun. 13, 1983

Related U.S. Application Data

[62] Division of Ser. No. 217,608, Dec. 18, 1980, Pat. No. 4,457,822.

[30] Foreign Application Priority Data

Dec. 27, 1979 [JP] Japan ................................ 54-169406

[51] Int. Cl.$^3$ ......................... B32B 31/12; C25B 9/00
[52] U.S. Cl. .................................... 156/151; 156/155; 156/280; 156/305; 204/252; 204/283; 204/290 R

[58] Field of Search ............... 29/429, 623.5; 156/150, 156/151, 155, 228, 280, 305; 204/98, 129, 252–258, 263–266, 283, 284, 290 R, 290, 291–293

[56] References Cited

U.S. PATENT DOCUMENTS 4,299,675 11/1981 Korach ................................ 204/98

Primary Examiner—Robert Dawson
Attorney, Agent, or Firm—Sughrue, Mion, Zinn, Macpeak & Seas

[57] ABSTRACT

An electrolysis apparatus comprising a diaphragm of a solid polymer electrolyte, and an anode electrode structure and a cathode electrode structure located on both sides of the diaphragm, at least one of the electrode structures intimately contacting the surface of said diaphragm, the intimately contacting electrode structure comprising a gas-permeable electrically conductive substrate and a film-like porous electrode catalyst layer bonded integrally thereto and a method for producing such.

5 Claims, 4 Drawing Figures

ELECTROLYSIS APPARATUS USING A DIAPHRAGM OF A SOLID POLYMER ELECTROLYTE, AND METHOD FOR PRODUCTION THEREOF

This is a division of application Ser. No. 217,608, filed Dec. 18, 1980, now U.S. Pat. No. 4,457,822.

FIELD OF THE INVENTION

This invention relates to an electrolysis apparatus using a diaphragm of a solid polymer electrolyte, and to a method for production thereof.

More specifically, this invention relates to an electrolysis apparatus for electrolyzing water or aqueous solutions of alkali metal halides, hydrochloric acid, sodium sulfate, etc., where the apparatus comprises a diaphragm of a solid polymer electrolyte such as an ion exchange resin membrane, and, closely contacting to at least one surface thereof, an electrode structure composed of an electrically conductive substrate and a film-like electrode catalyst layer bonded thereto, and to a method for producing the electrolysis apparatus.

BACKGROUND OF THE INVENTION

Various electrochemical devices utilizing solid polymer electrolytes (herein abbreviated SPE) are known. As apparatuses for generating electrical energy, U.S. Pat. Nos. 3,134,697, 3,297,482 and 3,432,355 for example, disclose fuel cells.

It is also known that the SPE's can be used in electrolysis cells for performing an electrolytic reaction by supplying electric energy, apparatuses for generating gases such as hydrogen or oxygen or gas concentrating apparatuses for electrolyzing water, etc. (see, for example, U.S. Pat. Nos. 3,489,670 and 4,039,409).

Attempts have been made recently to use SPE's in various other industrial electrolysis apparatuses. For example, Japanese Patent Application (OPI) No. 52297/78 discloses an electrolysis apparatus for producing sodium hydroxide and sulfuric acid by electrolyzing an aqueous solution of sodium sulfate.

Application of SPE's to electrolyzing an aqueous solution of hydrochloric acid is described in Japanese Patent Application (OPI) Nos. 95996/79 and 97581/79.

Suggestions have also been made to apply SPE's to the production of chlorine and sodium hydroxide by electrolysis of an aqueous solution of sodium chloride which now occupies an important position in the electrolysis industry. Such a technique has already been disclosed, for example, in Japanese Patent Application (OPI) Nos. 102278/78, 93690/79, 107493/79, and 112398/79.

These SPE electrolysis apparatuses comprise an ion exchange resin membrane as an electrolyte diaphragm and an anode catalyst material and a cathode catalyst material in a layer bonded directly to the both surfaces of the membrane. Such an apparatus can be employed to electrolyze an aqueous solution by passing an electric current from a current supplier in contact with the electrode catalyst layer, and is characterized by the distance between the electrodes being minimized to the thickness of the membrane, and theoretically, no electrolyte solution exists between the electrodes. Accordingly, the size of the apparatus is drastically reduced and electric resistance arising due to the presence of electrolyte solution and bubbles generated between the electrodes, which cannot be avoided in usual electrolysis apparatuses, is minimal and can be ignored. Correspondingly, the electrolysis voltage can be decreased as compared with that required for the conventional diaphragm method, ion exchange membrane method, etc., and this is why the SPE method provides an excellent energy-saving electrolyzing system.

Since in conventional SPE electrolyzing apparatuses, an electrode catalytic substance layer such as carbon, metals, or metal oxides is integrally held to the surface of an organic ion-exchange resin membrane, and an electric current supply means is brought into contact with the catalytic material layer, various difficulties in performance, manufacture and operation are encountered as described below.

(a) It is quite difficult to bond the electrode catalytic material layer firmly in a uniform thickness to the entire surface of the membrane, and also to control the area of the bonded portion freely.

(b) Bonding of the electrode catalytic material layer requires a binder, and this correspondingly increases the electric resistance of the membrane.

(c) Since an ion exchange resin membrane is mechanically weak and is readily destroyed at high temperatures, various restrictions in manufacture, such as the inapplicability of the usual thermal decomposing method, sintering method, spraying method, etc., exist. Thus, it is difficult to bond firmly the electrode catalyst layer having superior activity.

(d) There is a difference in life between the ion exchange resin membrane and the electrode catalytic material. Hence, in a unitary structure composed of these materials, it is impossible in practice to exchange, repair, or recover them separately during or after use in electrolysis.

(e) Since a current supplier is to be contacted with the very thin electrode catalyst layer, the ion exchange resin membrane and the electrode catalyst layer are susceptible to damage. To obtain sufficient current density and uniform current distribution, current must be supplied at many positions. Thus, the structure of the current supplier becomes complex, and contact resistance tends to increase due to poor contact, corrosion, etc. of electrical contacts.

SUMMARY OF THE INVENTION

An object of this invention is to provide an electrolysis apparatus using a diaphragm of a solid polymer electrolyte, which overcomes the above-described difficulties, and also a method for production thereof.

Another object of this invention is to provide an electrolysis apparatus using a diaphragm of a solid polymer electrolyte, which maintains the characteristics of the SPE-method electrolysis (i.e., smaller size electrolysis device and operability at low voltages) and has excellent performance in an electrolysis operation.

Still another object of this invention is to provide an electrolysis apparatus in which the diaphragm and the electrode structure can be separately produced, and can be easily exchanged, repaired or recovered independently from each other.

A further object of this invention is to provide a method for easily producing an electrolysis apparatus having excellent performance.

A characteristic feature of the present invention is that in an electrolysis apparatus using a solid polymer electrolyte diaphragm, an electrode structure is provided which is composed of an anode structure and a cathode structure located on both sides of the diaphragm, at least one of the electrode structures is contacted intimately with the surface of the diaphragm, and the electrode closely contacting the surface of the diaphragm is composed of a gas-permeable electrically conductive substrate and a porous film-like electrode catalyst layer bonded integrally to the substrate.

The present invention is also characterized in that in the electrode structure in the above-described electrolysis apparatus, an electric current supply reinforcing member having large openings is provided with the gas-permeable conductive substrate.

As a further preferred embodiment of the above-described electrolysis apparatus, the present invention is characterized by providing an interlayer between the porous film-like electrode catalyst layer and the solid polymer electrolyte diaphragm, of an electrically conductive anticorrosive porous coating which has a lower activity than the electrode catalyst layer.

By these characteristic structures, the present invention exhibits excellent operation and results which lead to achievement of the objects of this invention.

DETAILED DESCRIPTION OF THE INVENTION

Figure 2:
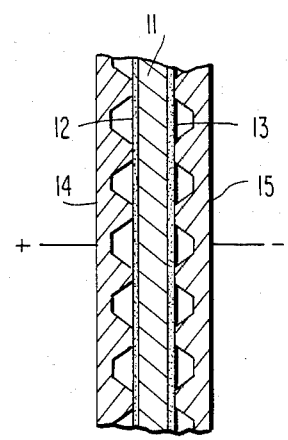
FIG. 2 is a view illustrating a conventional SPE-method electrolysis cell.
Figure 3:
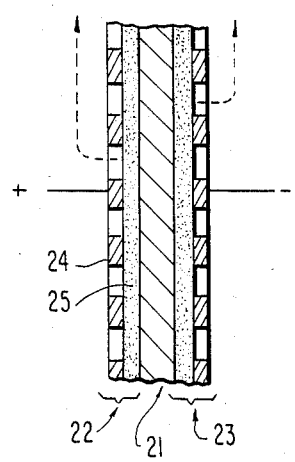
FIG. 3 is a view illustrating an embodiment of the electrolyzing apparatus of this invention.
Figure 4:
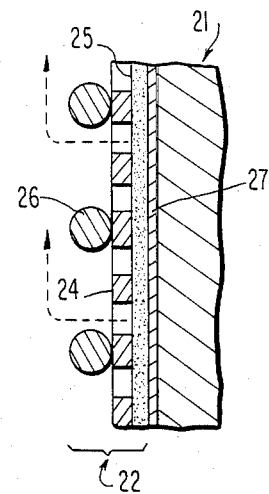
FIG. 4 is a view, partly enlarged, of another embodiment of the electrolysis apparatus of this invention.

A solid polymer electrolyte diaphragm shown at 21 in FIGS. 3 and 4 has the same function as the conventional SPE, and may be of any solid polymer electrolyte or ion exchange resin membrane having sufficient electric conductivity and corrosion resistance. Suitable solid polymer electrolytes which can be used are described in U.S. Pat. No. 3,297,482 and the cation exchange resin membranes described in U.S. Pat. Nos. 3,134,697, 3,297,482, 3,341,366, 3,432,355, 3,442,825, 3,489,670, and 4,039,409 may usually be used. Depending upon the electrolysis reaction employed, an anion exchange resin membrane may be used. A composite membrane composed of two or more membranes bonded to each other may also be used. The thickness of the membrane is not particularly restricted. Desirably, the thickness of the membrane is as small as possible because the thickness defines the distance between the electrodes and increasing thickness is a factor increasing the electric resistance. Because of restrictions in mechanical strength and manufacturing, the thickness is usually about 0.01 and 2 mm. An ion exchange resin membrane the same as that shown at 1 and 11 in FIGS. 1 and 2 and used in a conventional ion-exchange membrane method or SPE-method electrolysis apparatus can be used.

Important features of the present invention reside in the structure of the electrode structure shown at 22 and 23 in FIG. 3 and at 22 in FIG. 4, and a method for the production thereof. In the conventional SPE-method electrolysis apparatus, as shown in FIG. 2, an electrode catalyst layer composed of an anode 12 and an electrode catalyst layer composed of a cathode 13 are integrally bonded to both surfaces of an ion exchange membrane 11, and electric current supply means 14 and 15 are held, respectively, in contact with the electrode catalyst layers. In contrast, in the present invention, as typically shown in FIGS. 3 and 4 as an anode membrane 22, an electrode catalyst layer 25 is integrally bonded in a layer form to a gas-permeable electrically conductive substrate which concurrently serves as a current supply means, and it is sufficient for ion exchange resin diaphragm 21 to simply contact closely the electrode structure in building the electrolysis apparatus. Accordingly, diaphragm 21 and electrode member 22 can be produced separately, and moreover, since diaphragm 21 is simply contacted closely with the electrode diaphragm member, they can be separately removed during or after use. Thus, in the event that one of them begins to operate abnormally or its life is ended, it can be repaired or exchanged independently of the other. Such an advantage does not arise in the conventional SPE-method electrolyzing apparatus.

Since the electrode catalyst layer 25 is bonded to the electrically conductive substrate 24 composed of a metal such as titanium, restrictions in manufacture are mostly removed as compared with the case of bonding the layer to the ion exchange membrane 11. Thus, in producing such a structure, any known means of producing an electrode can be utilized which can provide a firmly bonded electrode coating having high catalytic activity. In particular, the properties of the electrode catalyst material are greatly affected by the electrode catalyst material manufacturing and coating conditions, and this invention has the advantage of being able to select the most suitable manufacturing conditions for an electrode structure.

The electrode structure of this invention can be applied not only as the anode structure 22, but also as a cathode structure 23. Either one of them suffices, and the other electrode, particularly a cathode, may, for example, be an ordinary electrode in an ion exchange membrane method shown, for example, at 2 and 3 in FIG. 1, or one of the electrode catalyst layers 12 and 13 bonded integrally to the ion exchange membrane 11 in the SPE method shown in FIG. 2. Furthermore, a means for reducing the electrolyzing voltage further by supplying oxygen gas to the cathode to perform depolarization can also be applied.

Figure 1:
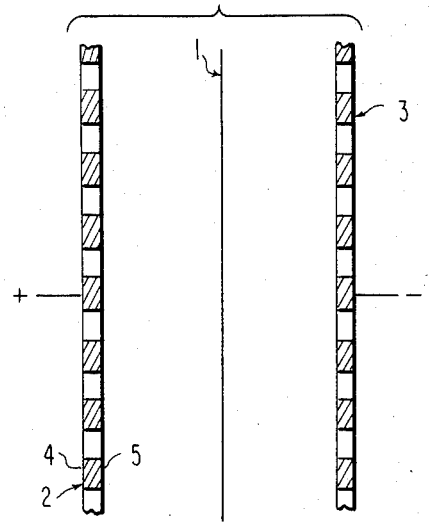
FIG. 1 is a view illustrating a conventional ion exchange membrane-method electrolysis cell.

Minimization of the interelectrode distance in a conventional ion exchange membrane-method electrolysis apparatus of the type shown in FIG. 1 by bringing the anode 2 and the cathode 2 into intimate contact with the ion exchange membrane has been proposed (see, for example, Japanese Patent Application (OPI) No. 47877/79). However, since the electrode catalyst layer 25 of this invention to be brought into intimate contact with the diaphragm 21 is a continuous film-like structure as shown in FIGS. 3 and 4 and the electrode catalyst layer itself is a gas- and liquid-permeable porous body, the present invention fundamentally differs from a conventional structure in which a solid electrode coating 5 is provided only on the surface of the electrode substrate 4 with openings and the coated substrate is brought into intimate contact with the diaphragm.

The gas-permeable electrically conductive substrate 24 of the electrode structure 22 has the function of a support and a current supply means for the electrode catalyst layer 25, and must have mechanical strength and electric conductivity and be made of a material with corrosion resistance as an electrode substrate. In the electrolysis apparatus of this invention, the electrolysis reaction takes place inside and at the surface of the electrode catalyst layer 25, and electrolysis products such as gases or liquids are removed from that surface of the electrode catalyst layer 25 which is opposite that surface in intimate contact with the diaphragm 21, as shown by the dotted arrows in FIGS. 3 and 4. Accordingly, the electrically conductive substrate 24 should have a number of openings which permit easy passage and discharge of such products therethrough. The side of each opening is desirably as large as possible so long as the substrate 24 can retain the continuous film-like electrode catalyst layer 25 thereon. Usually, the size of the opening is not more than about 5 mm. A suitable opening size ranges from about 100 microns to about 5 mm. The shape of the openings is not restricted, and the substrate 24 may be made of a mesh material, a porous plate formed by photoetching, a lattice-shaped structure, a porous body of an alloy resulting from a partial leaching-out thereof, a porous sintered body, etc. Known electrode substrate materials can be used as a material for the substrate 24. For example, depending upon whether it is used for an anode or a cathode, valve metals such a titanium, tantalum and niobium and the alloys thereof such as titanium-tantalum, titanium-tantalum-niobium, alloys, etc., conductive oxides such as $TiO_{2-x}$ (where $0<x<0.5$), metals such as iron and nickel, and metal compounds thereof such as $Fe_3O_4$, $NiFe_2O_4$, etc., may be chosen properly.

Since the conductive substrate 24 is itself a porous thin film, it can be directly used as a current supply substrate in a small-size electrolysis device. But for use in a large-size, large-capacity electrolysis apparatus, the mechanical strength and current capacity of such a porous thin film are insufficient. This problem has been solved by reinforcing the electrode structure by bonding the porous conductive substrate 24 to a current supply reinforcing member 26 with a similar material and shape to the conductive substrate but having a larger thickness and large openings as shown in FIG. 4. This has made it possible to supply a current of a large capacity uniformly to the electrode surface at the same time. An expanded titanium mesh usually used as a substrate of a metal electrode is suitable as the current supply reinforcing member 26. This member may be made of other materials and of other shapes such as rod, lattice, or perforated plate shapes. If desired, two or more layers of such a reinforcing member can be employed. Usually the conductive substrate 24 can be formed on the reinforcing member 26 by perforating a thin metal plate such as a titanium plate by photoetching, etc., or knitting or welding metallic wires in the shape of a mesh or lattice, etc., to form a porous plate, and bonding the resulting porous plate to the current supply reinforcing member, e.g., by welding, etc. Alternatively, an electrode active coating which is the same as a conventional insoluble metal electrode may be coated in advance on the surface of the porous conductive substrate 24. Since this coating inherently is corrosion resistant, this coating serves as a protective layer preventing corrosion of the conductive substrate 24, and in the event the porous film-like electrode catalyst layer 25 coated thereon should be broken for some reason or other, it acts as an electrode structure. Advantageously, in this case, the resulting electrolysis device can be caused to function as an electrolysis cell which is the same as an ion exchange membrane-method electrolysis cell having a very small interelectrode distance.

The film-like electrode catalyst layer 25 is continuously bonded integrally to the resulting porous conductive substrate 24. The electrode catalyst material may include the anodes and cathodes described in U.S. Pat. Nos. 3,134,697, 3,297,482, 3,432,355, 3,489,670 and 4,039,409, and other known substances with electrode catalyst activity. Typical anode catalyst materials include, for example, platinum-group metals such as ruthenium, iridium, platinum, palladium and rhodium, the alloys of these platinum-group metals such as platinum-iridium, platinum-palladium-rhodium, etc., alloys, oxides and mixed oxides of the platinum-group metals such as $RuO_2$, $PdO$, $RuO_2$—$IrO_2$, etc, mixtures of these oxides with oxides of valve metals such as titanium, tantalum, niobium and zirconium or other more base metals such as $TiO_2$, $Ta_2O_5$, $ZrO_2$, etc., metal borides such as $Sn_3B_4$, etc., carbides such as WC, TiC, etc., and nitrides such as AlN, TiN, etc., either alone or in combination.

Typical cathode catalyst materials include nickel, iron, valve metals such as titanium, zirconium, etc., the oxides thereof such as $TiO_2$, $WO_3$, $MoO_2$, etc., platinum-group metals such as platinum, palladium, ruthenium, iridium, etc., the oxides thereof such as $RuO_2$, $IrO_2$, etc., carbon and mixtures of these materials.

There is no particular restriction on the manner of bonding the electrode catalyst material as the porous film-like electrode catalyst layer 25 to the conductive substrate 24, and various means can be employed. One suitable means involves depositing the electrode catalyst material on the conductive substrate 24, either directly or after forming a porous catalyst layer substrate thereon, by thermal decomposition, plating, dipping or coating followed by baking, spraying, hot pressing, vacuum deposition, etc. Formation of the porous catalyst layer substrate prior to the above bonding procedure can be effected, for example, by welding, spraying, partial leaching-out of an alloy coating, sintering, etc.

The electrode catalyst layer 25 must be porous to such an extent that it is permeable to gases and electrolytes, because, as shown on an enlarged scale in FIG. 4, the catalyst layer 25 should permit migration of ions involved in the electrolytic reaction and discharge of the electrolysis products such as gases generated in the spaces inside the electrode catalyst layer from that surface of the catalyst layer 25 which is opposite the surface to be in intimate contact with the diaphragm 21. A suitable porosity for the electrode catalyst layer ranges from about 30% to about 90%, preferably 50% to 70%. Preferably, the electrode catalyst layer 25 has pores usually with a diameter of about 4 to 100 microns and substantially extending through the catalyst layer 25. There is no particular restriction on the thickness of the electrode catalyst layer 25. However, since larger thicknesses result in a substantial increase in the average distance between the electrodes and this causes an increase in the electrolysis voltage, the catalyst layer 25 should usually have a thickness of about 2 to about $50\mu$.

The electrolysis apparatus is produced by contacting the ion exchange resin diaphragm 21 intimately with the electrode structure 22 with the electrode catalyst layer 25 bonded thereto in the above-described manner. The method of achieving the intimate contact is not particularly limited, and it may be performed by mechanical bonding under a suitable pressure. If desired, in order to ensure more intimate contact and thus avoid formation of an electrolyte solution layer on the contact surface, a hot press method or a method involving use of a binder such as a fluorocarbon resin can be used.

It has been found in accordance with this invention that the performance of the electrolysis apparatus of this invention in an electrolysis operation can be further improved by providing an anticorrosive electrically conductive porous coating 27 with a lower activity than the electrode catalyst material in the interface between the electrode catalyst layer 25 and the solid polymer electrolyte diaphragm 21, as shown in FIG. 4. This effect is especially outstanding when the coating layer 27 is provided on the side of the anode electrode structure.

In electrolyzing an aqueous solution of an alkali metal halide, the contact surface between the diaphragm 21 and the anode electrode structure 22 becomes more or less strongly alkaline due to the presence of OH ion which leaks from the cathode side and moves backward, and therefore, the electrode catalyst layer is likely to be corroded. Providing the anticorrosive coating layer 27 protects that surface and inhibits corrosion. Moreover, since the coating 27 has low activity and thus has high overvoltage characteristics in chlorine and oxygen generating reactions, no gas is generated on its surface and an increase in electrolysis voltage due to the presence of bubbles can be prevented. On the other hand, the OH ion which moves backward is attracted without a discharge reaction to the low-activity coating 27 having the same potential as the anode catalyst layer 15 because of its conductivity. As a result, a layer of OH ion is formed in the vicinity of the coating 27 and serves as a barrier layer hampering the movement of OH ion in the direction of the anode. Accordingly, oxygen generation and a decrease of current efficiency at the anode which are due to the backward movement of OH ion can be minimized.

Usually, it is preferred for the conductive porous coating 27 with low activity to be first coated on the surface of the electrode catalyst layer 25. Then the coated layer 25 should be brought into intimate contact with the diaphragm 21. Alternatively, the coating 27 may first be coated on the diaphragm, and then the electrode catalyst layer 25 may be brought into intimate contact with the diaphragm 21. The manner providing the coating 27 is not particularly limited, and, for example, any of the known thermal decomposition, plating, vacuum deposition and spraying methods can be employed. Suitable substances forming the conductive porous coating 27 include Pt and electrically conductive oxides of valve metals such as $TiO_{2-x}$, where x is as hereinbefore defined, which have high overvoltages against low overvoltage anode catalyst materials such as $RuO_2$. Other materials which have similar properties depending upon the electrolysis reaction to be performed may also be used. The coating layer 27 should be electrically conductive, and also porous so that the layer is permeable to ions involved in the electrolysis reations. A suitable degree of porosity for the coating layer 27 can range from about 30% to about 90%, preferably 50% to 70%. The thickness of the coating 27 is usually not more than about $10\mu$ to obtain satisfactory results. Since coating 27 is very thin, providing the coating 27 between the diaphragm 21 and the electrode catalyst layer 25 results in only a slight increase in the interelectrode distance and electric resistance. Thus, the consequent increase in electrolysis voltage is slight and can be ignored.

The following Examples are given to illustrate the present invention with reference to electrolysis apparatuses for various aqueous solutions. It should be understood that these examples are not to be construed in any way to limit the present invention. Unless otherwise indicated herein, all parts, percents, ratios and the like are by weight.

EXAMPLE 1

A titanium mesh having an opening size of 0.2 mm was welded onto an expanded titanium mesh having an opening ratio of 60% (percentage opening area calculated according to the method of projections) and a thickness of 1.5 mm to produce an electrically conductive substrate. A Ti-Zn alloy powder of Ti and Zn in a weight ratio of 70:30 and a particle size of 4 to $5\mu$ was plasma-sprayed onto the substrate at a current of 400 A and a voltage of 26 V while passing a argon carrier gas at a rate of 6 liters/min. The thickness of the plasma-sprayed layer was $100\mu$. The resulting product was immersed in a 15% aqueous solution of HCl heated at 40° C. to leach-out the Zn in the alloy. Thus, a film-like porous electrode catalyst layer substrate composed of titanium having a porosity of about 70% and a pore size of about 4 to $20\mu$ was formed.

An electrode catalyst coating solution was separately prepared from 120 ml of a 10% aqueous solution of HCl, 4.5 g (as Ru) of $RuCl_4$ and 5.5 g (as Ti) of $TiCl_4$. The porous substrate of Ti produced as described above was immersed for 2 minutes in this solution. After withdrawal, the substrate was allowed to stand for 15 minutes in air to remove the excess coating solution, and then baked at 500° C. for 15 minutes in air. This operation of immersion and baking was repeated five times to form an anode electrode structure.

An ion exchange resin membrane (Nafion #315, a trademark for a perfluorocarbon sulfonic acid solid polymer product of E. I. du Pont de Nemours & Co.) was used as a solid polymer electrolyte diaphragm, and a porous graphite powder layer, as a cathode, was bonded to one surface of this diaphragm. The anode structure was brought into intimate contact with the other surface of the diaphragm to produce an electrolysis device.

The resulting electrolysis device was subjected to electrolysis testing by supplying a saturated aqueous solution of sodium chloride to the anode side and a 20% aqueous solution of sodium hydroxide to the cathode side. At a temperature of 85° C. and a current density of 30 $A/dm^2$, the electrolysis voltage was 3.10 to 3.15 V which was considerably lower than that (about 3.6 to 4.0 V) in an ordinary ion exchange membrane-method electrolysis process. The current efficiency at the anode was about 82%.

EXAMPLE 2

An electrolysis device was built using an electrode structure and an ion exchange resin membrane which were produced in the same manner as in Example 1 except that a porous platinum layer having low activity with a thickness of $1\mu$ was coated by vacuum deposition on that surface of the membrane with which the anode structure was to be brought into contact. Coating of the above-described platinum layer was performed carefully so that platinum was deposited on the surface of the diaphragm only in a direction perpendicular to the diaphragm surface so as to avoid entry into the inside pore portions of the diaphragm.

The electrolysis device was subjected to electrolysis testing under the same conditions as described in Example 1. The electrolysis voltage was 3.1 to 3.15 V and scarcely increased. On the other hand, the current efficiency at the anode was 91%, showing an increase of more than 10% over that in Example 1.

EXAMPLE 3

A circular plate of titanium having a thickness of 1 mm and a diameter of 35 mm was perforated using a conventional photoetching method to produce a porous plate having a pore size of 1 mm and an opening ratio of 70%. Titanium hydride powder having a particle size of about 40 to 10$\mu$ and dextrin as a binder were suspended in water, and the resulting suspension was coated on the porous circular plate in a thickness of 0.5 mm. The coated porous plate was dried, and then baked at 1200° C. for 2 hours under a pressure of about $10^4$ torr in a vacuum sintering furnace. Thus, an electrode catalyst layer substrate composed of a porous titanium coating having a pore size of 4 to 30$\mu$ and a porosity of about 70% was formed on the electrically conductive substrate.

A hydrochloric acid-n-butyl-alcohol solution of iridium chloride, ruthenium chloride and tantalum chloride in an Ir:Ru:Ta weight ratio of 1:1:2 was brush coated on the resulting electrode catalyst layer substrate, and then baked at 550° C. for 5 minutes in an atmosphere composed of $O_2$ and $N_2$ in a volume ratio of 20:80. This operation of coating and baking was repeated 6 times to obtain an anode structure having a ternary complex oxide of Ir—Ru—Ta bonded thereto as an electrode catalyst layer. The amount of the electrode catalyst material deposited was 0.1 g/cm$^2$.

The same type of electrolysis device as described in Example 1 was produced using the resulting anode structure, and subjected to a hydrochloric acid electrolysis testing using a 15% aqueous solution of HCl as an anolyte and a catholyte. The electrolysis was performed at a current density of 30 A/dm$^2$ and a temperature of 60° C. As a result, the electrolysis voltage was 1.55 V, and the current efficiency at the anode was 95%. The electrolysis voltage was thus decreased by about 0.7 V as compared with conventional hydrochloric acid electrolysis.

EXAMPLE 4

Tantalum powder having a particle size of 7 to 30$\mu$ was plasma-sprayed on the same type of porous titanium plate as described in Example 3 to form a porous coating having a porosity of about 70% and a thickness of about 100$\mu$. The plasma-spraying was carried out at a current of 500 A and a voltage of 30 V while passing an argon carrier gas at a rate of 6 liters/min. The coated porous plate was heat-treated at 500° C. for 1 hour in an atmosphere of hydrogen to activate the surface, thereof and thus to produce a porous electrode catalyst layer substrate. A 10% aqueous hydrochloric acid solution containing iridium chloride, tantalum chloride and tin chloride in an Ir:Ta:Sn weight ratio of 2:1:1 was brush coated on the resulting catalyst layer substrate. The coated substrate was sufficiently dried, and then baked at 525° C. for 15 minutes in an atmosphere composed of $O_2$ and $N_2$ in a ratio of 30:70. This operation of coating and baking was repeated six times to form an electrode catalyst layer. The amount of the electrode catalyst substance coated was 0.16 g/cm$^2$.

Platinum was vacuum deposited in a thickness of 1$\mu$ on the electrode catalyst layer to form an electrically conductive porous coating with low activity.

A nickel mesh having an opening size of 1 mm obtained by spraying nickel powder onto a nickel mesh was contacted intimately as a cathode electrode structure to one surface of a cation exchange resin membrane (Nafion #315), and the anode electrode structure obtained as described above was brought into intimate contact with the other surface of the diaphragm using a resin of Teflon (trade name for a polytetrafluoroethylene polymer, produced by E. I. du Pont de Nemours & Co.)

An electrolysis device was produced using the resulting structure, and was used in electrolyzing sodium sulfate by supplying a 15% aqueous solution of sodium hydroxide to the cathode side and an aqueous solution containing 10% $Na_2SO_4$ and 5% $H_2SO_4$ to the anode side. The electrolysis was carried out at a current density of 30 A/dm$^2$ and a temperature of 50° C. Sodium hydroxide and hydrogen were generated at the cathode and oxygen and sulfuric acid were formed at the anode. The electrolysis voltage was 2.3 V.

EXAMPLE 5

Titanium oxide powder having a particle size of 7 to 20$\mu$ was plasma-sprayed on the same type of porous titanium plate as described in Example 3 to form a porous coating having a thickness of about 100$\mu$ and a porosity of about 60%. The coated porous titanium plate was baked at 600° C. for 2 hours in an atmosphere of hydrogen to partly reduce the titanium oxide coating and to obtain an electrode catalyst layer substrate having increased electric conductivity.

Separately, a solution was prepared which contained 1 g (as Pd) of palladium chloride, 1 g (as Ru) of ruthenium chloride, 40 ml of 10% HCl and 20 ml of isopropyl alcohol. The resulting electrode catalyst layer substrate composed of porous titanium oxide was immersed for 2 minutes in the resulting solution. The substrate was withdrawn, dried at room temperature for 10 minutes, and baked at 500° C. for 20 minutes in a furnace filled with an atmosphere composed of $O_2$ and $N_2$ in a volume ratio of 30:70. This operation of immersion and baking was repeated 10 times to obtain an anode structure in which the electrode catalyst layer contained 0.2 g/cm$^2$ of palladium oxide and ruthenium oxide A porous electrically conductive titanium oxide coating with low activity, 2$\mu$ thick, was formed on the surface of the resulting electrode catalyst layer by spraying.

An electrolysis device was produced in the same manner in Example 1 using the resulting anode structure. In the electrolysis device, an aqueous solution of sodium chloride was electrolyzed at a temperature of 85° C. and a current density of 30 A/dm$^2$ by supplying a saturated aqueous solution of sodium chloride to the anode side and 20% aqueous solution of sodium hydroxide to the cathode side. As a result, the electrolysis voltage was 3.3 V and the current efficiency at the anode was about 86%.

EXAMPLE 6

A titanium plate having a thickness of 1 mm was perforated by a photoetching method to form a porous titanium plate having an opening size of 3 mm and an opening ratio of 80%.

Graphite powder containing 30% of a mixture of ruthenium oxide and palladium oxide (3:1 weight ratio in the mixture) was mixed with a fluorocarbon (polytetrafluoroethylene) resin. The resulting mixture was coated on the porous titanium plate, and hot-pressed at 300° C. to produce an electrode structure having a porous electrode catalyst layer. An electrically conductive porous platinum layer with low activity, 1μ thick, was formed on the surface of the electrode structure by vacuum deposition.

An ion exchange resin membrane (Nafion #315) was adhered intimately to the platinum-coated electrode structure by hot pressing using a fluorocarbon (polytetrafluoroethylene) resin. As a cathode, a mixture of nickel powder and graphite was bonded to one surface of the ion exchange resin membrane using a resin of Teflon as a binder.

An electrolysis device was produced by using the resulting structure, and subjected to electrolysis testing under the same conditions as described in Example 5. As a result, the electrolysis voltage was 3.2 V, and the current efficiency at the anode was 88%.

While the invention has been described in detail and with reference to specific embodiments thereof, it will be apparent to one skilled in the art that changes and modifications can be made therein without departing from the spirit and scope thereof.

What is claimed is:

1. A method for producing an electrolysis apparatus which comprises
   forming a gas-permeable electrically conductive substrate,
   bonding a film-like porous electrode catalyst layer integrally to the gas-permeable electrically conductive substrate to form at least one electrode structure, and then
   providing a porous electrically conductive coating having substantially non-catalytic activity on the surface of said film-like porous electrode catalyst layer or on the surface of a diaphragm of a solid polymer electrolyte wherein said solid polymer electrolyte is an ion-exchange membrane, and then
   bonding, through said coating, said film-like porous electrode catalyst layer to said diaphragm.

2. The method of claim 1, wherein the method additionally includes bonding an electric current reinforcing member having large pores to said substrate prior to bonding said film-like porous electrode catalyst layer integrally to said gas-permeable electrically conductive substrate.

3. The method of claim 1, wherein the electrode catalyst layer is formed on the electrically conductive substrate by thermal decomposition, plating, immersion or coating followed by baking, spraying, hot pressing or vacuum deposition.

4. The method of claim 1 wherein the method additionally includes,
   providing a substrate for the film-like porous electrode catalyst layer on the gas-permeable electrically conductive substrate, and then
   coating an electrode catalyst material on the catalyst layer substrate.

5. The method of claim 1, wherein the catalyst layer substrate is formed on the electrically conductive substrate by welding, spraying, partial leaching-out of an alloy coating or sintering.

* * * * *